(12) United States Patent
Toriyama (10) Patent No.: US 6,502,673 B1
(45) Date of Patent: Jan. 7, 2003

(54) CYLINDER DEVICE FOR A DISK BRAKE

(75) Inventor: Noriyuki Toriyama, Kuwana (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/684,895

(22) Filed: Oct. 10, 2000

(30) Foreign Application Priority Data

Oct. 8, 1999 (JP) .......................................... 11-288696

(51) Int. Cl.$^7$ ............................................. F16D 65/10
(52) U.S. Cl. .................. 188/218 A; 188/72.4; 188/71.1
(58) Field of Search ............................... 188/72.4, 370, 188/367, 368, 369, 71.1, 72.1, 218 XL, 218 A; 29/888.3, 527.6; 74/18.2; 92/168

(56) References Cited

U.S. PATENT DOCUMENTS

| | | | |
|---|---|---|---|
| 3,490,343 A | * 1/1970 | Afanador et al. | 92/168 |
| 3,497,038 A | * 2/1970 | Schrader et al. | 188/152 |
| 3,528,301 A | * 9/1970 | Wasmer | 188/18.2 |
| 4,121,845 A | * 10/1978 | Reynolds et al. | 277/212 FB |
| 4,199,159 A | * 4/1980 | Evans | 277/212 FB |
| 4,248,329 A | * 2/1981 | Torigoe | 188/264 G |
| 4,270,442 A | * 6/1981 | Bainard et al. | 92/168 |
| 4,304,416 A | * 12/1981 | Oshima | 277/212 FB |
| 4,324,318 A | * 4/1982 | Karasudani | 188/73.31 |
| 4,431,090 A | * 2/1984 | Kinoshita | 188/264 G |
| 4,503,947 A | * 3/1985 | Heidmann et al. | 188/72.8 |
| 4,506,768 A | * 3/1985 | Innocent | 188/370 |
| 4,524,677 A | * 6/1985 | Ashman et al. | 188/72.4 |
| 4,537,289 A | * 8/1985 | Vongruenberg et al. | 188/97.4 |
| 5,261,511 A | * 11/1993 | Libsch et al. | 188/218 XL |
| 5,499,701 A | * 3/1996 | Harinaga | 188/72.4 |
| 5,540,311 A | * 7/1996 | Kobayashi et al. | 188/370 |
| 5,558,345 A | * 9/1996 | Kobayashi et al. | 277/168 |
| 5,575,358 A | * 11/1996 | McCormick | 188/264 G |
| 5,615,754 A | 4/1997 | Kobayashi et al. | |
| 5,826,953 A | * 10/1998 | Heubner | 303/122.13 |
| 6,073,733 A | * 6/2000 | Kapanowski | 188/72.4 |
| 6,164,422 A | * 12/2000 | Sanitate et al. | 188/72.4 |

* cited by examiner

Primary Examiner—Jack Lavinder
Assistant Examiner—Benjamin A Pezzlo
(74) Attorney, Agent, or Firm—Liniak, Berenato & White (57) ABSTRACT

It is an object of this invention to provide a cylinder device for a disc brake which facilitates the installation of thick ring portions of a dust boot into an inner circumferential groove in a cylinder bore and which also reduces the weight of a caliper. In this invention a piston is slidably received in the cylinder bore at an actuating portion of the caliper, one thick ring portion is installed into an outer circumferential groove of the piston and another thick portion is installed into an inner circumferential groove adjacent to the open end of the cylinder bore. The dust boot has an intermediate flexible portion received in a stepped large diameter bore stepped up from the cylinder bore. A cutout is formed on a peripheral portion of the stepped large diameter bore surrounding/covering said intermediate flexible portion of the dust boot.

4 Claims, 10 Drawing Sheets

CYLINDER DEVICE FOR A DISK BRAKE

FIELD OF THE INVENTION

This invention relates to a cylinder device for a disc brake as defined in the preamble portion of claim 1 and more specifically relates to an improvement in the assembly of a dust boot.

DESCRIPTION OF THE RELATED ART

Figure 9:
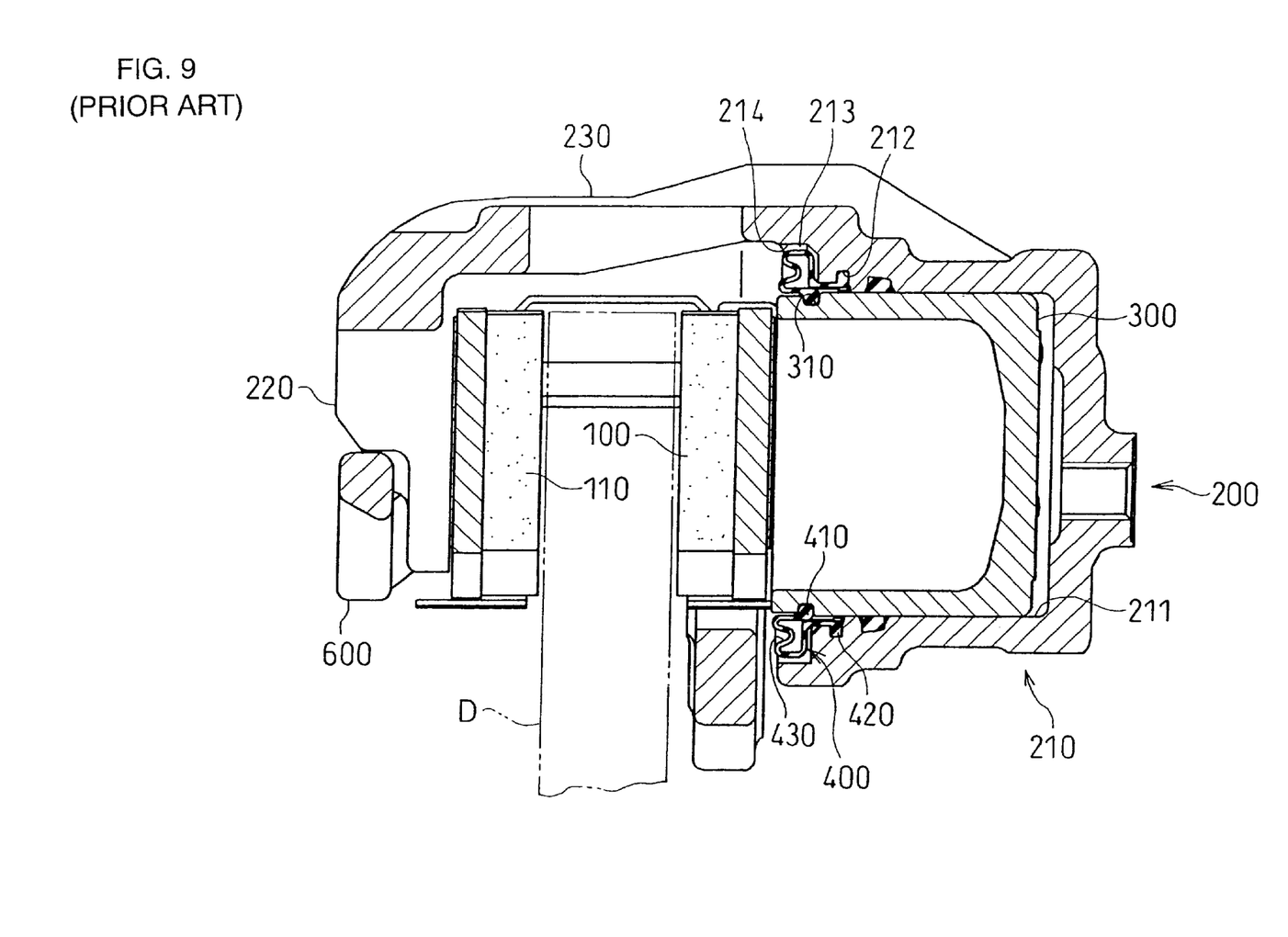
FIG. 9 is a vertical cross-section view of the conventional cylinder device for a disc brake.

One example of a traditional disc brake device is disclosed in FIG. 9. This prior art comprises: a carrier 600 to be fixed on a stationary portion of a vehicle; a caliper 200 configured with an inboard actuating portion 210, an outer reaction leg 220 facing the actuating portion, and a bridge 230 extending between the actuating portion 210 and the reaction leg 220; a piston 300 slidably fit into a cylinder bore 211 formed in the actuating portion 210 of the caliper 200; an inner pad 100 urged to be pressed by the piston 300 and frictionally engaged with one side surface of a disc rotor D; an outer pad 110 urged to be pressed by the reaction leg 220 and frictionally engaged with the other side surface of the disc rotor D; and a dust boot 400 designed so that an intermediate flexible portion 430 thereof is received in a large diameter bore 213 stepped up from the cylinder bore 211 and surrounded by a peripheral portion 214 defining the large diameter bore 213. Thick ring portions 410, 420 of the dust boot 400 are fit respectively into an outer circumferential groove formed on the peripheral surface of the piston 300 and into an inner circumferential groove 212 formed on the inner circumferential surface located adjacent to the open end of the cylinder bore 211.

This type of disc brake device is configured to perform a braking action by use of a pair of pads 100, 110 to sandwich and press both sides of the disc rotor D in the axial direction. The dust boot 400 is designed to protect the slidable portion of the piston 300 in the cylinder bore 211 from intrusion of foreign matter.

A process of installing the piston 300 and the dust boot 400 in the caliper 200 is explained with reference to FIGS. 10(A)–(D).

Figure 10A:
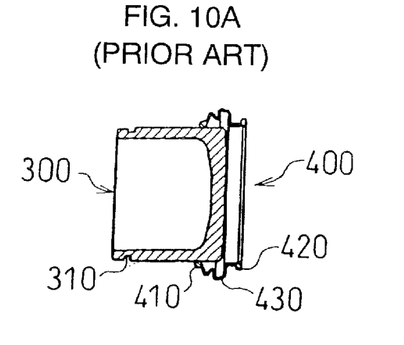
FIGS. 10A–D are explanation views of a conventional method for installing the dust boot.
Figure 10B:
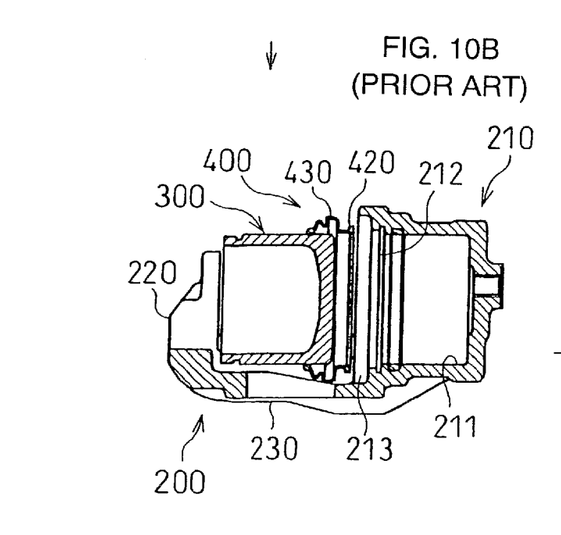
Figure 10C:
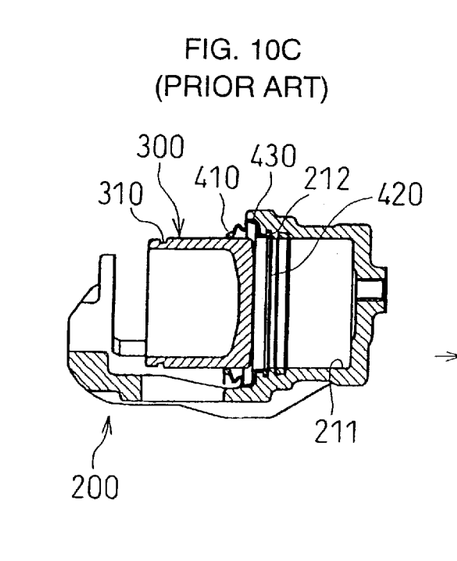
Figure 10D:
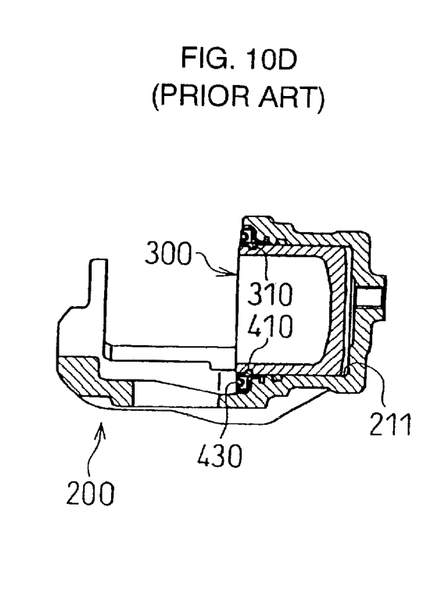

As shown in FIG. 10(A), one thick ring portion 410 of the dust boot 400 is elastically connected with the periphery of the cup-like piston 300 at its bottom side. As shown in FIG. 10(B), the piston 300 with the dust boot 400 is to be held, by one hand, within the space defined by the actuating portion 210, the bridge 230 and the reaction leg 220 so that the bottom of the piston 300 faces the actuating portion 210. As shown in FIG. 10(C), the other thick ring portion 420 of the dust boot 400 is fit, by the other hand, into the inner circumferential groove 212 adjacent to the open end of the cylinder bore 211. As shown in FIG. 10(D), as the piston 300 is being forced into the cylinder bore 211, the one thick ring portion 410 is fit into the outer circumferential groove 310 on the peripheral surface of the piston 300.

The above-described conventional art has the following points to be improved.

In the conventional device, the installation of the dust boot 400 is manually performed, which makes the installation complex and requires considerable time. That is, in the process shown in FIG. 10(C), when the other thick ring portion 420 of the dust boot 400 is to be fit into the inner circumferential groove 212 which is positioned within the cylinder bore 211, the peripheral portion becomes an obstacle for fingers to be inserted, which specifically causes a problem in fitting the other thick ring portion 420 into the inner circumferential groove 212.

Because of the difficulty in installing the dust boot 400, it is possible that the piston 300 is forced into the cylinder bore 211 with the dust boot 400 not being installed properly, which may cause a damage to the dust boot 400.

The peripheral portion functions to protect the dust boot 400 against flying gravel during operation in a vehicle and to increase the strength of the connecting section between the actuating portion 210 and the bridge 230 of the caliper 200. However, the peripheral portion at the brake center side has no effect on the strength increase. In this respect, its portion is wasteful, thereby increasing the weight of the device.

OBJECT AND SUMMARY OF THE INVENTION

It is an object of this invention to provide a cylinder device for a disc brake device, which facilitates the installation work of the dust boot 400 into the inner circumferential groove 212 of the cylinder bore 211 and removes the wasteful portion of the peripheral portion 214, thereby eliminating the problems such as a weight increase and reducing the weight of the caliper device.

This invention is based on the finding that the peripheral portion 214 at the brake center side has no effect with respect to the strength increase and has an effect for protecting the dust boot 400 against flying gravel during operation in a vehicle but mainly increases the weight of the device.

To this end the present invention provides a cylinder device as defined in claim 1. Preferred embodiments of the invention are defined in the sub-claims.

BRIEF DESCRIPTION OF THE DRAWINGS

The above and other objects and the attendant advantages of the present invention will become readily apparent by reference to the following detailed description when considered in conjunction with the accompanying drawings, in which.

DETAILED DESCRIPTION OF THE PREFERRED EMBODIMENTS

Embodiments of this invention are explained with reference to the following figures. The same reference numbers used in the conventional disc brake device in FIG. 9 will be used and the explanation of which will be omitted here.

The cylinder device for a disc brake in accordance with present invention is characterized in that a cutout 215 is partially provided on the peripheral portion 214 defining the large diameter bore 213 stepped up from the open end of the cylinder bore 211 as shown in FIGS. 1–4. The cutout 215 may be formed by casting, by cutting-away, or by other ways.

Figure 2:
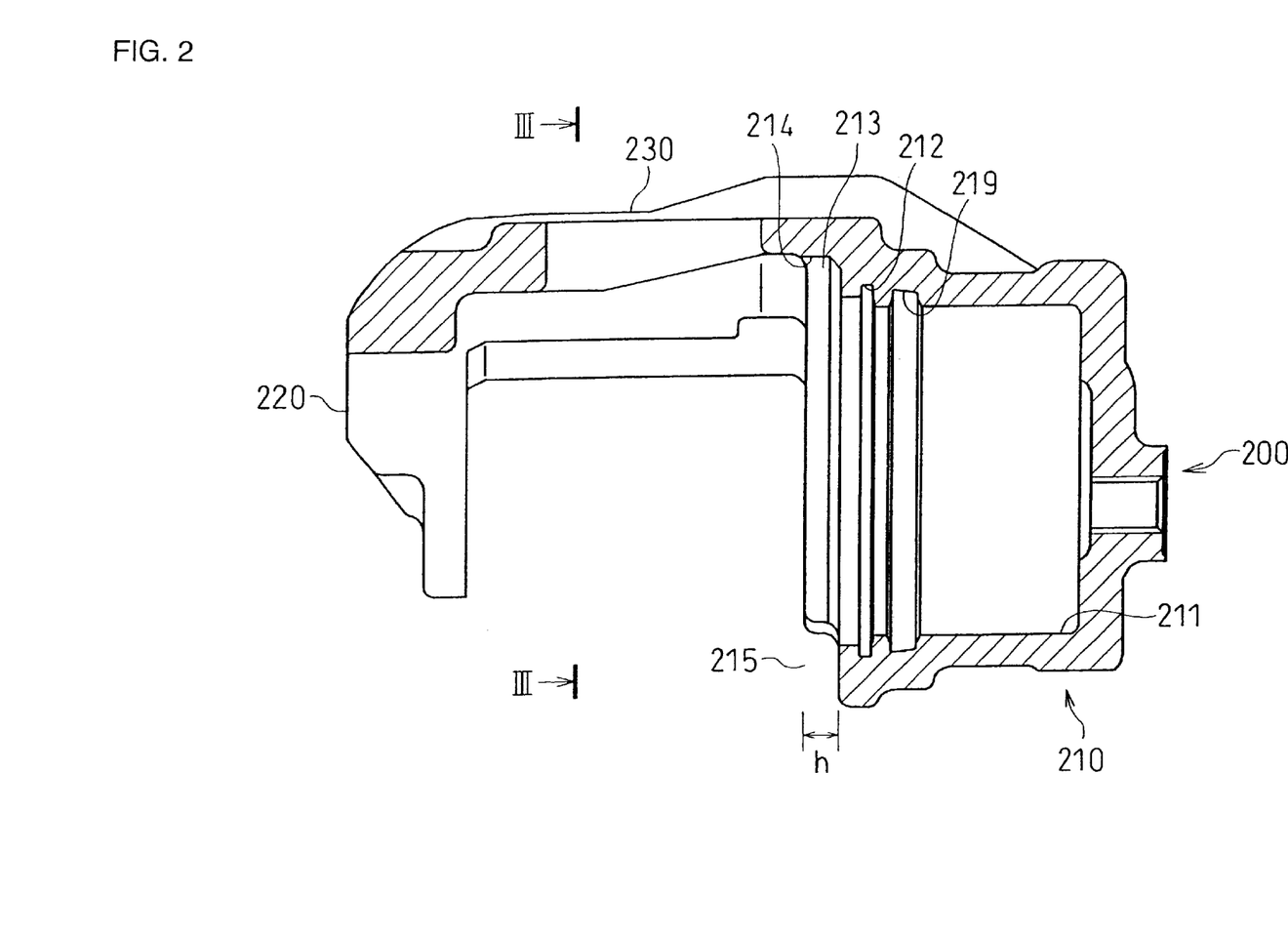
FIG. 2 is a vertical cross-section view of the caliper.
Figure 3:
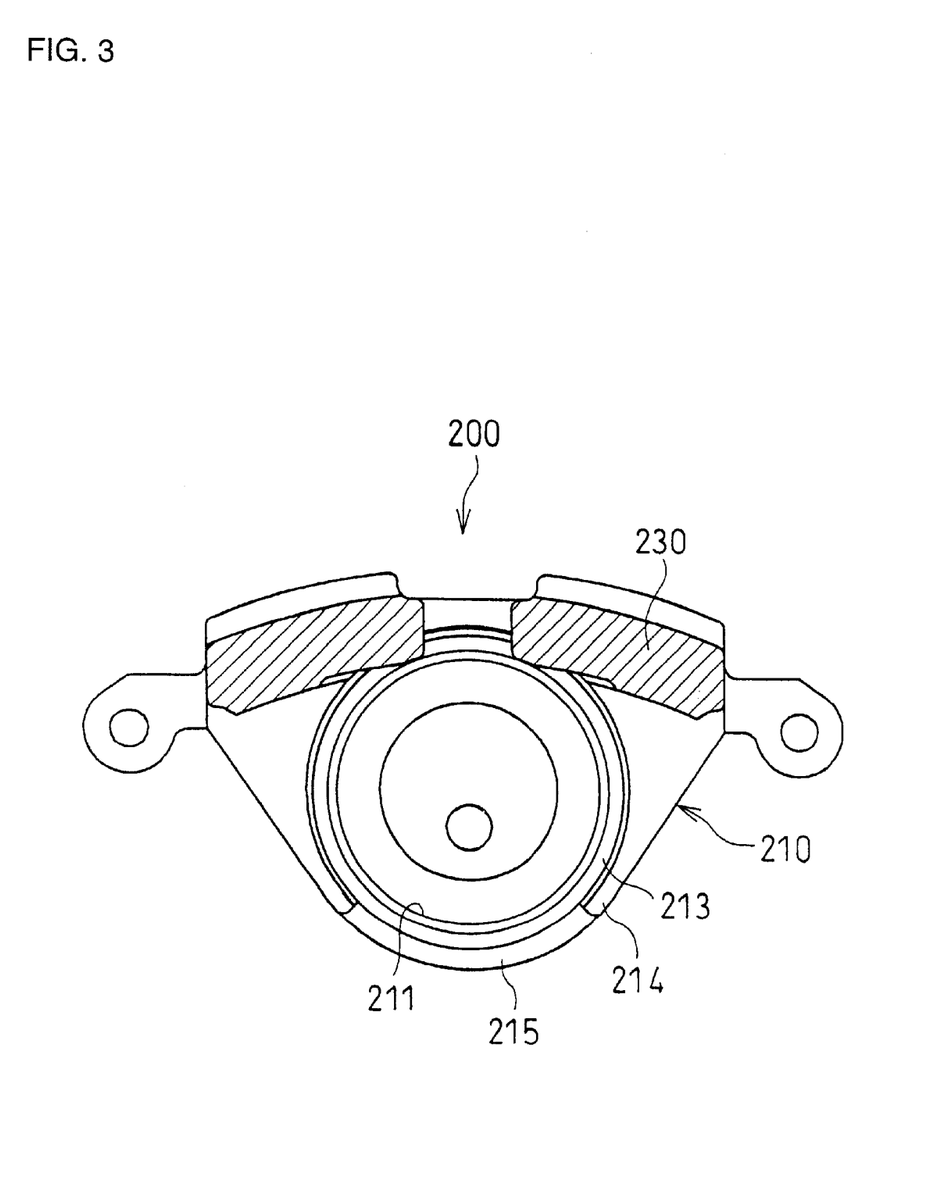
FIG. 3 is a cross-section view of FIG. 2 taken along the line III—III.
Figure 4:
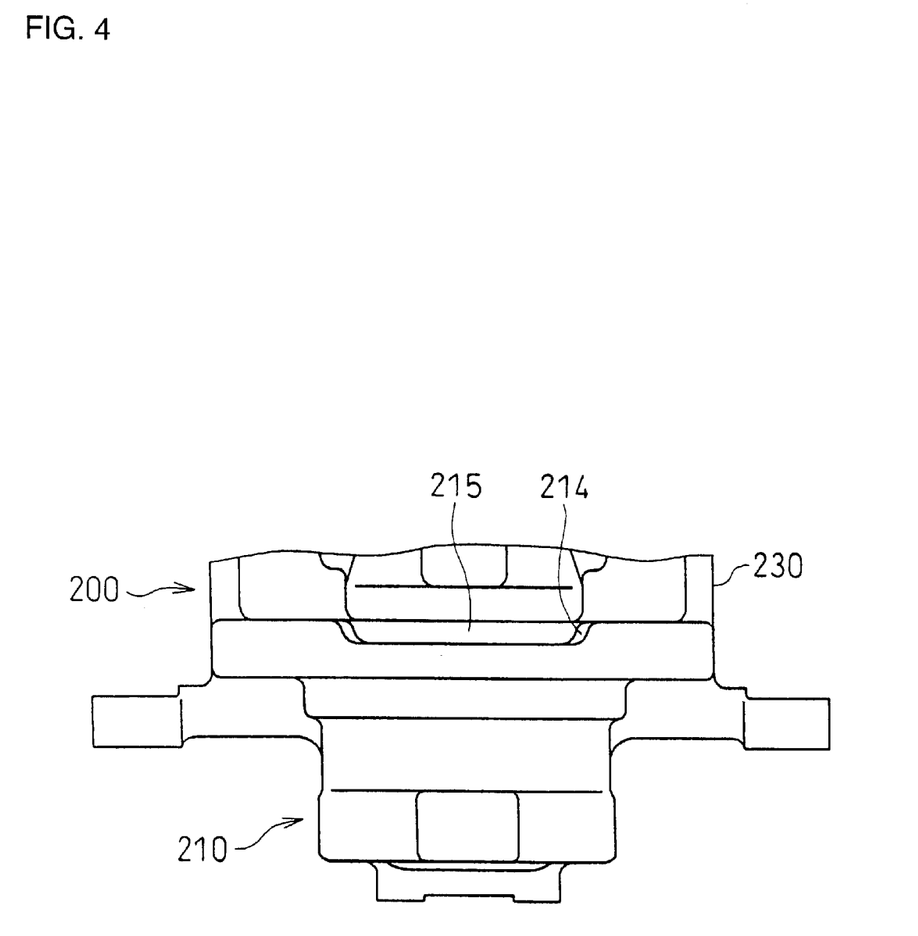
FIG. 4 is a view of the caliper device as seen from the brake center side of the actuating portion.

As shown in FIG. 2, by forming the cutout 215, the inner circumferential groove 212 is effectively positioned closer to the open end of the cylinder bore 211 by height "h" of the cutout 215 as compared to the conventional device of FIG. 9. Accordingly, the peripheral portion 214 that could be an obstacle for the installation of the dust boot 400 is removed to clear the way for the installation work of the dust boot 400 which is thereby facilitated.

Fundamentally, the width of the cutout 215 in the circumferential direction should be at least sufficient to insert fingers and push the dust boot 400 into the cylinder bore 211. When a tool is available for this task, the width may be designed to be narrower. The cutout 215 may be formed through the entire height "h" of the peripheral portion 214 as shown in FIG. 2 or formed with a remaining peripheral portion 214 near the cylinder bore 211. The minimum requirement is that the cutout 215 is no obstacle for the installation work of the dust boot 400.

FIGS. 1–4 show an embodiment where only one cutout 215 is formed at the brake center side of the peripheral portion 214 defining the stepped large diameter bore 213. Although the peripheral portion 214 basically has a function to reinforce the connecting section between the actuator portion 210 and the bridge 230, the peripheral portion 214 at the brake center side has no effect with respect to the strength increase. Therefore, this portion essentially increases the weight of the device. Accordingly, a weight reduction may be achieved by forming the cutout 215 at the brake center side of the peripheral portion 214.

Figure 1:
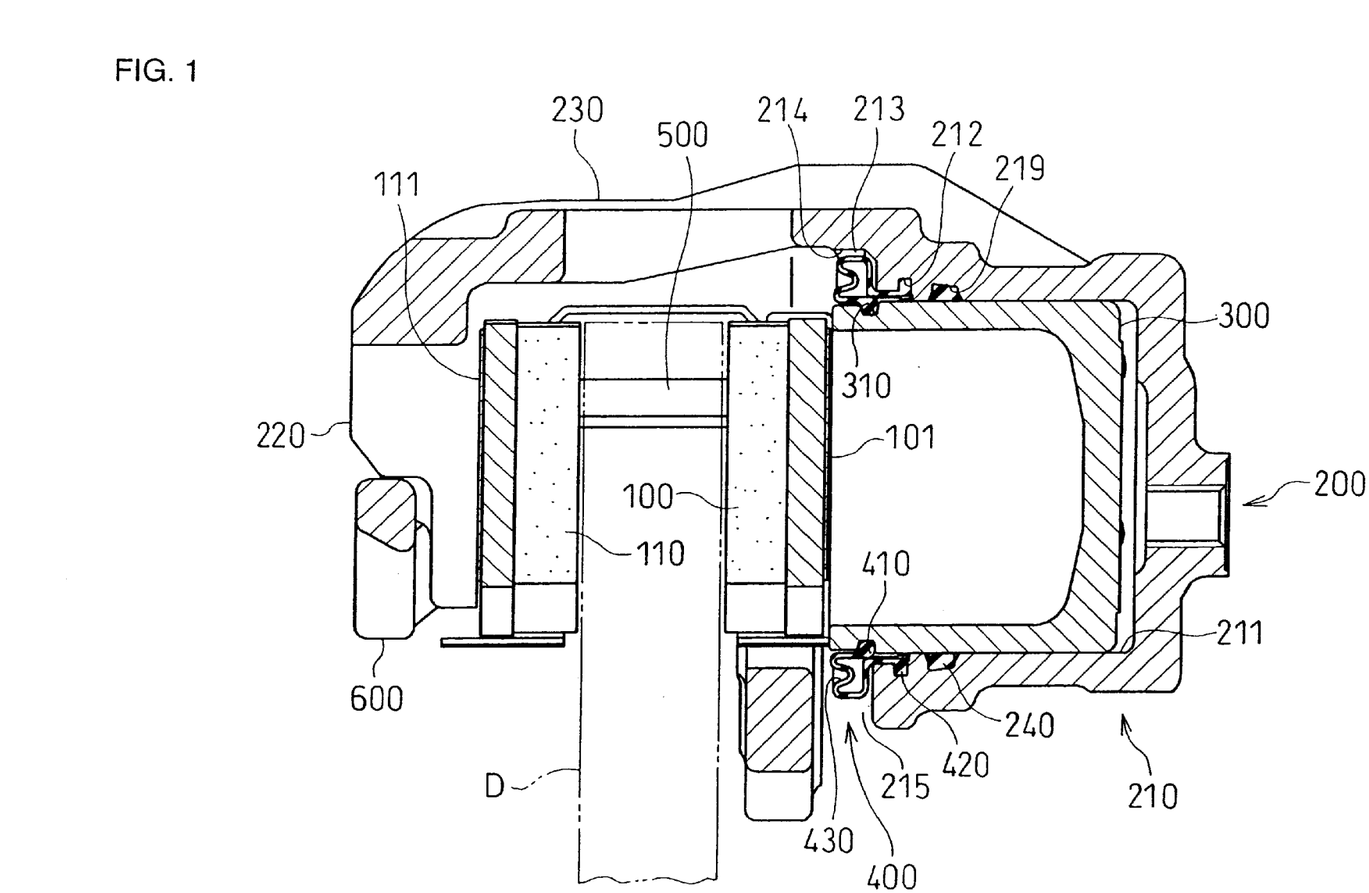
FIG. 1 is a vertical cross-section view of the cylinder device for the disc brake in accordance with a first embodiment of this invention.

FIG. 1 includes an inner shim 101, an outer shim 111, an anti-rattle spring (pad liner) 500, and a carrier 600, i.e. a torque-receiving member.

Figure 5:
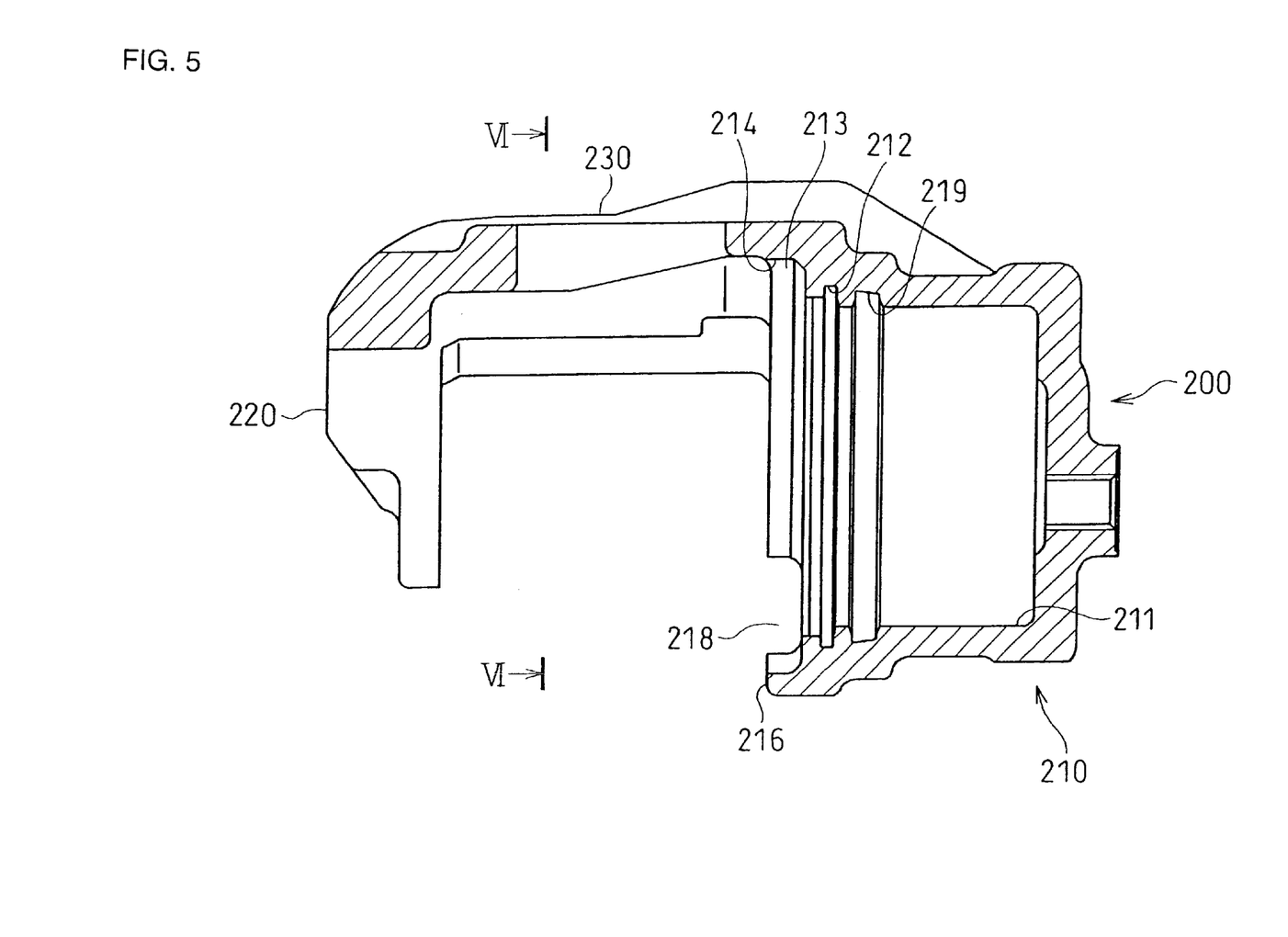
FIG. 5 is a vertical cross-section view of the caliper in another embodiment.
Figure 6:
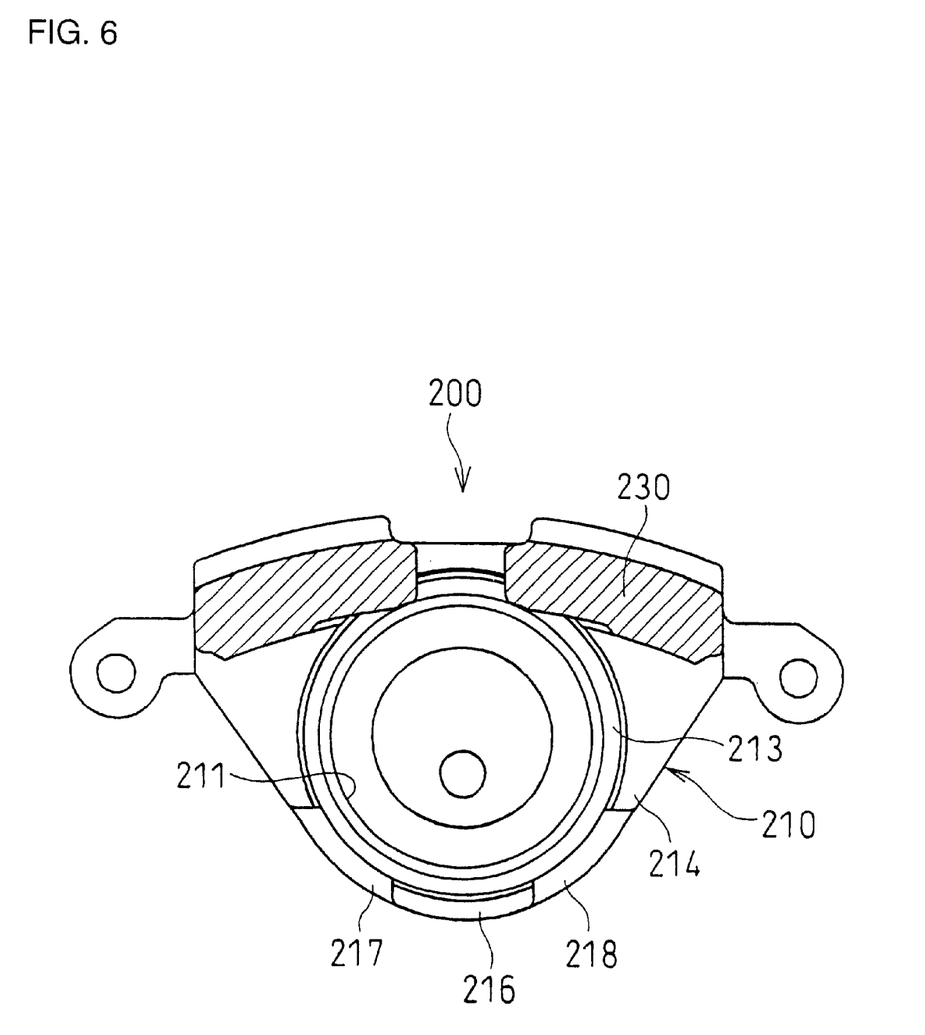
FIG. 6 is a cross-section view of FIG. 5 taken along the line VI—VI.
Figure 7:
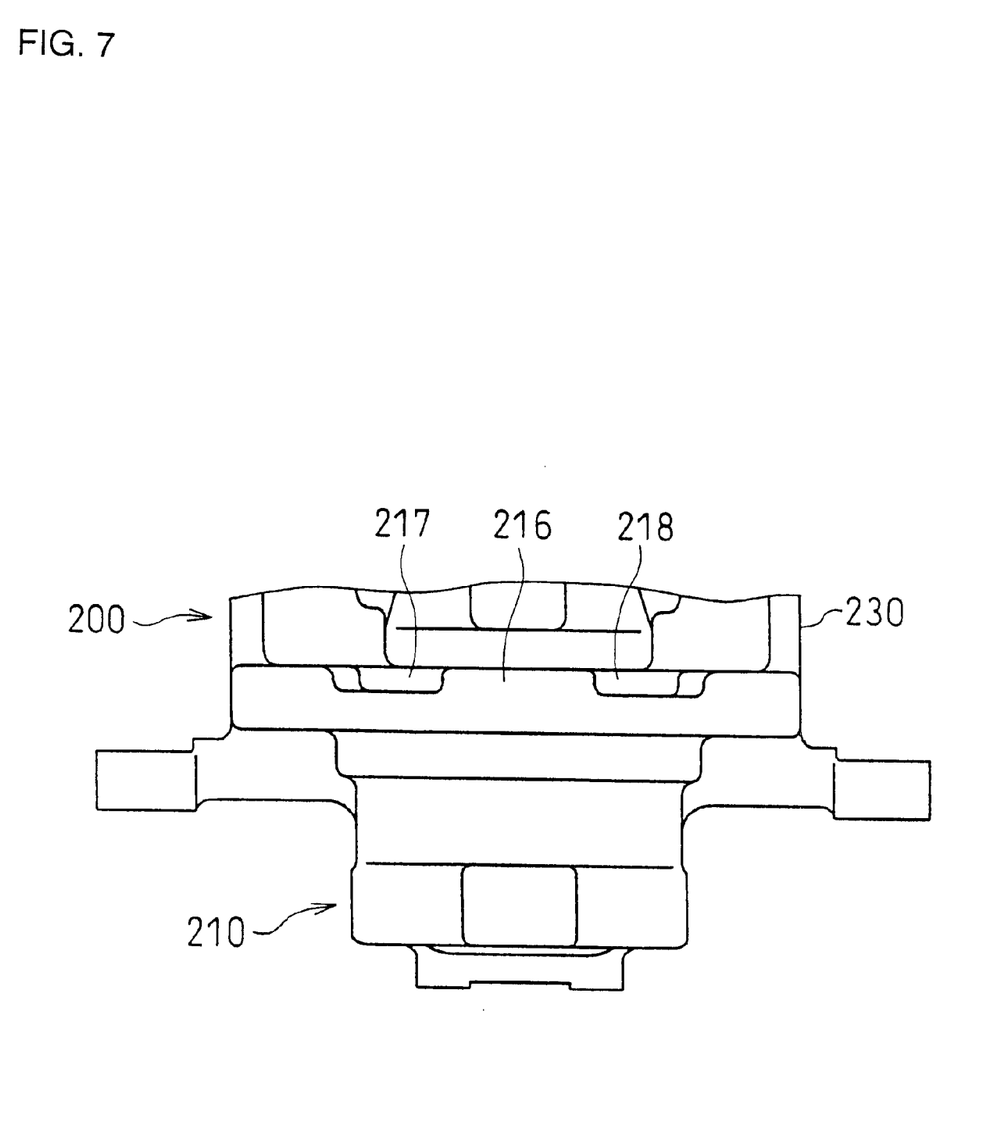
FIG. 7 is a view of the caliper device as seen from the brake center side of the actuating portion in another embodiment.

FIGS. 5–7 show another embodiment where cutouts 217, 218 are formed at both sides of the central portion 216 at the brake center side of the peripheral portion 214 defining the stepped large diameter bore 213. That is, some of the peripheral portion 214 is left at the central portion 216 in the circumferential direction, and the cutouts 217, 218 are formed at the two sides thereof. In that both hands may be used to push the dust boot 400 into the cylinder bore 211, the installability is improved. The cutouts 217, 218 may be symmetrically formed with the central portion 216 in-between, which also provides for a well-balanced installation work.

A position where the cutout is formed and the number, height, and width of the cutout(s) may be freely designed as long as a high installability of the dust boot is maintained and the caliper is not unduly weakened at this portion.

A sealing groove 219 in FIG. 5 is formed at the inner circumferential surface of the cylinder bore 211 which, when fitted with a piston seal 240, fluid-tightly seals the cylinder bore 211, and has a piston role back function.

Figure 8:
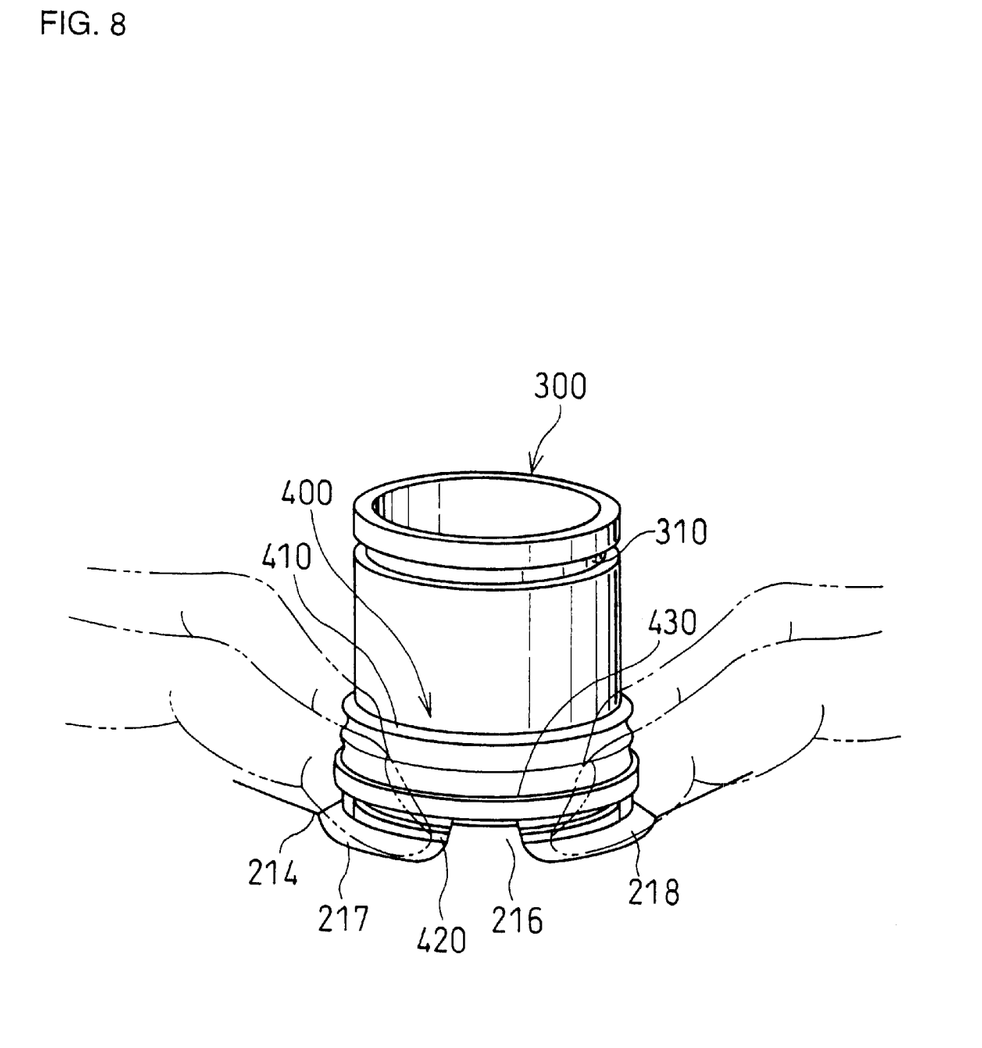
FIG. 8 is an explanation view of the method of installing the thick ring portion of the dust boot into the inner circumferential groove in the cylinder bore in a cylinder device in accordance with the present invention.

By structuring the invention as above, an easy fitting of the thick ring portion 420 of the dust boot 400 into the inner circumferential groove 212 may be accomplished in that, the fingers on both hands (for example, index fingers and middle fingers) may be inserted into the cylinder bore 211 (not shown in FIG. 8) through the cutouts 217, 218 for pushing the thick ring portion 420 of the dust boot 400. Further, the entire circumference of the thick ring portion 420 can be pushed in with tracing fingers.

This invention has the following advantages. By forming the cutout on the peripheral portion defining the stepped large diameter bore, the thick ring portion of the dust boot can be easily fit into the inner circumferential groove in the cylinder bore, which shortens the installation time of the dust boot and also facilitates the installation work.

The thick ring portion of the dust boot can be surely fit into the inner circumferential groove, which eliminates a brake malfunction due to a damage of the dust boot.

As the cutout is partially formed at the brake center side on the peripheral portion, weight of the caliper device is reduced without sacrificing the protection from damage by flying gravel during use in a vehicle.

Frictional heat generated by the braking operation does not remain in the stepped large diameter bore, which increases the durability of the flexible dust boot.

It is readily apparent that the above-described has the advantage of wide commercial utility. For example, this invention is generally applicable to a brake with two separate brake levers. It may be understood that the specific form of the invention hereinabove described is intended to be representative only, as certain modifications with the scope of these teachings will be apparent to those skilled in the art.

While the foregoing invention has been shown and described with reference to a preferred embodiment, it will be understood by those possessing skill in the art that various changes and modifications may be made without departing from the spirit and scope of the invention. Accordingly, reference should be made to the following claims in determining the full scope of the invention.

What is claimed is:

1. A cylinder device for a disc brake comprising:

a caliper having an inner actuator, an outer reaction leg, and a bridge extending between and connecting said actuator and said reaction leg;

a piston slidably received in a cylinder bore formed in said actuator;

a dust boot having an intermediate flexible portion and thick ring portions at opposite ends thereof, wherein one of said thick ring portions is fit into an outer circumferential groove on said piston and the other of said thick ring is fit into an inner circumferential groove of said cylinder bore adjacent to the open end thereof, and said flexible portion of said dust boot is received in a large diameter bore stepped up from said cylinder bore and defined by said bridge and a peripheral portion extending at least at a disc rotor center side of said actuator opposite said bridge, said flexible portion is surrounded by said peripheral portion, wherein a cutout, through which a human finger may pass upon installing said dust boot in said inner circumferential groove of said cylinder bore, is formed on said peripheral portion on said disc rotor center side of said actuator.

2. The cylinder device for a disc brake as claimed in claim 1, wherein said cutout is formed on a line extending through said disc rotor center and a center of the cylinder bore.

3. The cylinder device for a disc brake as claimed in claim 1, wherein said cutout comprises at least two cutouts separately formed at both sides of a line extending through said rotor center and the center of the cylinder bore.

4. The cylinder device for a disc brake as claimed in claim 3, wherein said cutouts are provided symmetrical with respect to said line.

* * * * *